(12) United States Patent
Nishikawa

(10) Patent No.: US 10,418,834 B2
(45) Date of Patent: Sep. 17, 2019

(54) POWER SOURCE APPARATUS

(71) Applicant: Hosiden Corporation, Osaka (JP)

(72) Inventor: Yasunori Nishikawa, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 168 days.

(21) Appl. No.: 15/655,195

(22) Filed: Jul. 20, 2017

(65) Prior Publication Data

US 2018/0069408 A1    Mar. 8, 2018

(30) Foreign Application Priority Data

Sep. 5, 2016  (JP) .................. 2016-173011

(51) Int. Cl.
*H02J 7/00* (2006.01)
*H02J 7/02* (2016.01)

(52) U.S. Cl.
CPC ............ *H02J 7/007* (2013.01); *H02J 7/0027* (2013.01); *H02J 7/0029* (2013.01); *H02J 7/0044* (2013.01); *H02J 7/0055* (2013.01); *H02J 7/022* (2013.01); *H02J 2007/0037* (2013.01); *H02J 2007/0039* (2013.01); *H02J 2007/0059* (2013.01); *H02J 2007/0062* (2013.01); *H02J 2007/0095* (2013.01); *H02J 2007/0096* (2013.01)

(58) Field of Classification Search
CPC ....... H02J 2007/0096; H02J 2007/0059; H02J 7/0029; H02J 7/0055; H02J 2007/0062; H02J 2007/0037; H02J 2007/0039; H02J 7/0027; H02J 7/0044; H02J 7/04; H02J 2007/0095; H02J 7/007; H02J 7/022
See application file for complete search history.

(56) References Cited

U.S. PATENT DOCUMENTS 8,180,395 B2 *  5/2012  Moran ................. G06F 1/1626
                                                        455/556.1
8,363,370 B2 *  1/2013  Shiner ................. H02J 7/0031
                                                        361/155
(Continued)

FOREIGN PATENT DOCUMENTS

JP    2008-228492 A    9/2008
JP    2012-175895 A    9/2012
(Continued)

*Primary Examiner* — Helen Rossoshek
(74) *Attorney, Agent, or Firm* — Dilworth & Barrese, LLP.; Michael J. Musella, Esq.

(57) ABSTRACT

A power source apparatus includes a power source section configured to output a current comprising a preset current value as a power supply current after reducing a voltage value of a power supply voltage in case the power supply current reaches a preset current value, a first protection section configured to stop operation of the power source section if the power supply voltage stays below a first voltage value until lapse of a first period subsequent to establishment of connection between a mobile terminal device and a power supply terminal, and a second protection section configured to cause the power source section to output a power supply voltage of a voltage value based on instruction information by a second time interval if the voltage value of the power supply voltage falls below a second voltage value after reaching a target voltage value.

4 Claims, 3 Drawing Sheets

(56) References Cited

U.S. PATENT DOCUMENTS

| | | | |
|---|---|---|---|
| 8,665,572 B2* | 3/2014 | Liu | H02J 7/0031 |
| | | | 320/128 |
| 8,861,164 B2* | 10/2014 | Mikolajczak | H02H 3/20 |
| | | | 361/103 |
| 9,643,506 B2* | 5/2017 | Lei | B60L 11/1822 |
| 10,116,172 B2* | 10/2018 | Fischer | H02J 7/0044 |
| 2005/0280398 A1* | 12/2005 | Lee | H01M 10/46 |
| | | | 320/134 |
| 2008/0224667 A1 | 9/2008 | Tanaka et al. | |
| 2011/0267726 A1* | 11/2011 | Ikeuchi | H01M 10/44 |
| | | | 361/63 |
| 2013/0305528 A1* | 11/2013 | Anderson | H02J 7/0052 |
| | | | 29/825 |
| 2014/0253032 A1* | 9/2014 | Bruwer | H02M 1/36 |
| | | | 320/108 |
| 2016/0064962 A1* | 3/2016 | Huang | H02J 7/0055 |
| | | | 320/114 |
| 2016/0241016 A1* | 8/2016 | Rana | H02H 3/006 |
| 2016/0303989 A1* | 10/2016 | Lei | B60L 11/1822 |
| 2017/0005499 A1* | 1/2017 | Zhang | H02J 7/0029 |
| 2017/0202467 A1* | 7/2017 | Zitnik | A61B 5/04001 |
| 2018/0025934 A1* | 1/2018 | Hong | H01L 21/71 |
| | | | 205/124 |
| 2018/0220719 A1* | 8/2018 | Chang | A41D 1/005 |
| 2019/0165588 A1* | 5/2019 | Wen | H02H 7/18 |

FOREIGN PATENT DOCUMENTS

| | | |
|---|---|---|
| JP | 2014-212658 A | 11/2014 |
| JP | 2015-135564 A | 7/2015 |
| JP | 2016-15807 A | 1/2016 |

* cited by examiner

POWER SOURCE APPARATUS

CROSS REFERENCE TO RELATED APPLICATIONS

This application is based on and claims priority under 35 U.S.C. Section 119 to Japanese Patent Application No. 2016-173011 filed on Sep. 5, 2016, the entire content of which is incorporated herein by reference.

TECHNICAL FIELD

This disclosure relates to a power source apparatus for supplying electric power to a mobile terminal device.

RELATED ART

Conventionally, mobile terminal devices such as smart phones have been widely used. Such mobile terminal device is equipped with a rechargeable battery, so that the mobile terminal device is driven by electric power stored in the battery. Such battery is charged by the mobile terminal device, which mobile terminal device, in turn, is charged by using an AC adaptor disclosed in e.g. JP2015-135564A (an example of "power source apparatus" relating to this application).

The AC adaptor disclosed in JP2015-135564A is for use in charging a battery (corresponding to "battery" above) included in a computer (an example of "mobile terminal device" above) includes an output circuit for outputting DC current and a switching circuit configured to switch an overcurrent protection characteristic of the output circuit from an inverted L-characteristics (characteristic similar in shape to inverted letter "L") to a fold-back type drooping characteristic, when the power state of the computer is changed from OFF state to ON state.

SUMMARY

According to the technique disclosed in JP2015-135564A, if there occurs flow of an overcurrent due to a certain cause in the course of charging of the battery, overcurrent protection is provided by the fold-back drooping characteristic. On the other hand, it is known that if the mobile terminal device and the AC adaptor are erroneously connected to each other with some foreign object present therebetween (this will be referred to as "half-short-circuit state" (incomplete short-circuit)) hereinafter, the connected portions become red-hot within a period of a few seconds, leading to smoke generation or ignition, etc. For this reason, the convention has coped with this problem by decreasing or entirely eliminating a constant current characteristic portion in the fold-back type drooping characteristic such as the technique disclosed in JP2015-135564A.

Here, in recent years, the art has promoted increase of the capacity of the battery in order to increase the total operating time of the mobile terminal device. And, in conjunction with such capacity increase of battery, the art has contemplated to improve charging efficiency through changing the voltage of power to be supplied to the mobile terminal device (corresponding to the "power supply voltage") for the purpose of reducing the charging period. As one technique to change the power supply voltage, it is conceivable to variably set the power supply voltage through communication between the mobile terminal device and the AC adaptor effected at the time of connection of the AC adaptor to the mobile terminal device, for instance. However, since a constant current characteristic is used for determination of the current output (power supply voltage) of the AC adaptor prior to determination of such power supply voltage, it is difficult to realize change of power supply voltage and the above-described protection under the above-described half short-circuit state compatibly with each other.

Embodiments of the present invention concern a power source apparatus capable of providing overcurrent protection while allowing a mobile terminal device to confirm the power supply capacity of this power source apparatus through communication between the mobile terminal device and the power source apparatus at an initial stage of connection therebetween.

The power source apparatus according to this disclosure comprises a power source apparatus for supplying power to a mobile terminal device having a battery and configured to charge the battery with the power, the apparatus comprising:

an instruction information acquisition section configured to acquire instruction information indicating an instruction value for a power supply voltage to be supplied to the mobile terminal device by communicating with the mobile terminal device after the mobile terminal device is connected to a power supply terminal;

a power source section configured to output a power supply voltage having a voltage value based on the instruction information and configured also to reduce a voltage value of the power supply voltage if a power supply current to be supplied to the mobile terminal device reaches a preset current value in association with output of the power supply voltage and then to output a current comprising the preset current value as the power supply current;

a first protection section configured to stop operation of the power source section if the power supply voltage outputted from the power source section stays below a preset first voltage value during lapse of a present first period after connection of the mobile terminal device to the power supply terminal; and a second protection section configured to cause the power source section to output the power supply voltage having the voltage value based on the instruction information by a preset second time interval if the power supply voltage outputted from the power source section falls below a preset second voltage value after reaching a target voltage value.

In this case, the power supply apparatus can acquire, from the mobile terminal device, instruction information indicating an instruction value of power supply voltage to be supplied to this mobile terminal device. Further, by setting the first period as such a period that allows avoidance of smoke generation and ignition even in the event of the half short-circuit connection between the mobile terminal device and the power supply apparatus, if the voltage value of the power supply voltage outputted from the power supply apparatus stays below the first voltage value due to the half short-circuit, operation of the power source section can be stopped by the first protection section before occurrence of smoke generation or ignition. Also, if an unexpected drop in the power supply voltage or overcurrent is detected while the power supply apparatus is supplying power to the mobile terminal device without presence of any foreign object between the mobile terminal device and the power supply apparatus, the power source section is controlled to output a power supply voltage of the voltage value based on the instruction information, by the second time interval. Thus, smoke generation or ignition can be prevented also in the event of continuation of such unexpected situation. In this way, according to the above-described feature, it is possible to provide overcurrent protection such as half short-circuit protection from the initial stage of connection between the mobile terminal device and the power source apparatus while allowing the mobile terminal device to confirm the power supplying capacity of the power source apparatus.

Further, according to one embodiment of the power source apparatus, the instruction information acquisition section can be configured to effect continuously its communication with the mobile terminal device by a predetermined interval after establishment of connection between the mobile terminal device and the power supply terminal and the power source section can be configured to output the power supply voltage of a current voltage value until new instruction information is acquired by the communication.

In this case, if the output characteristic of the power source apparatus is set such that a constant current is outputted until lapse of a predetermined period after the power supply voltage having the predetermined voltage value is outputted, it becomes possible for the mobile terminal device to utilize the output characteristic of the power source apparatus for determination and recognition of a maximum output capacity for the power supply voltage at this timing. Therefore, it becomes possible to cause the mobile terminal device to determine whether to change the voltage value of the power supply voltage or not.

Further, according to one embodiment of the power source apparatus, the instruction value of the power supply voltage indicated by the instruction information can be set according to a charging efficiency of the battery by the mobile terminal device.

The above arrangement allows the mobile terminal device to determine whether the charging efficiency is good or not based on a voltage of the battery which changes in real time and then to determine the instruction value of the power supply voltage indicated by the instruction information based on the result of this determination.

DESCRIPTION OF EMBODIMENTS

A power source apparatus relating to this disclosure is used for supplying electric power to a mobile terminal device including a battery to be used for charging this battery with the power. The power source apparatus has a protection function so as to avoid smoke generation or ignition from the power source apparatus or from the mobile terminal device even when a power supply voltage does not have a planned voltage value. Next, a power source apparatus 1 according to this embodiment will be explained.

Figure 1:
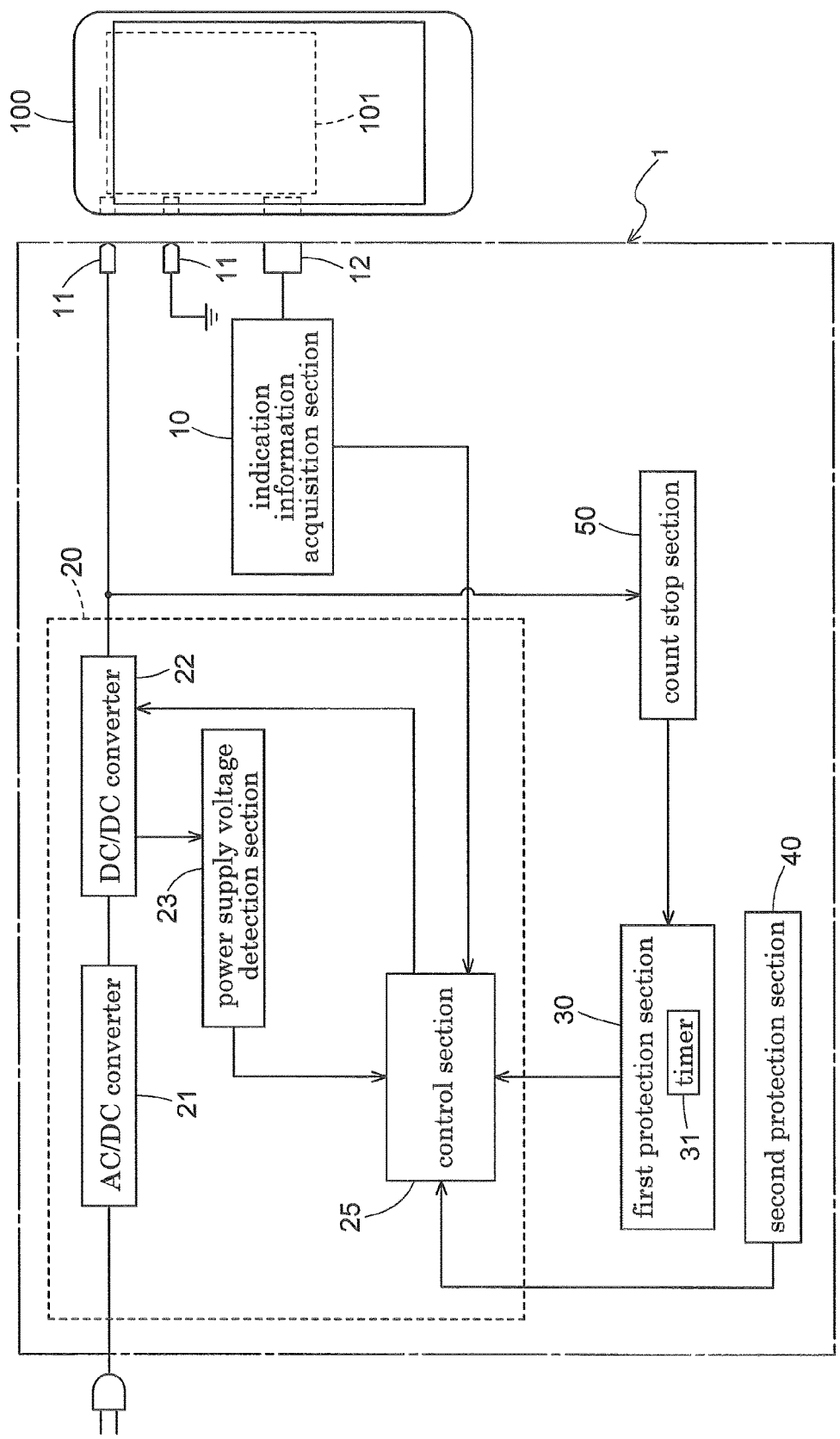
FIG. 1 is a schematic diagram showing a configuration of a power source apparatus.

FIG. 1 is a schematic diagram showing a configuration of the power source apparatus 1. FIG. 1 shows also a mobile terminal device 100 receiving power supply from the power source apparatus 1. This mobile terminal device 100 includes a battery 101 which is charged by the mobile terminal device 100. Here, the mobile terminal device 100 refers to a terminal device carried by an owner or a user, such as a smart phone, etc. As a power source, power stored in the battery 101 is utilized. The power supply apparatus 1 supplies power to the mobile terminal device 100 for use in charging the latter's battery 101.

The power source apparatus 1 includes respective functional units, i.e. an instruction information acquisition section 10, a power source section 20, a first protection section 30, a second protection section 40, and a count stop section 50. The respective function units can be formed by using at least one of a discrete component, an IC (Integrated Circuit), and an MPU (Micro-processing unit).

The instruction information acquisition section 10 is configured to acquire instruction information indicating an instruction value for a power supply voltage to be supplied to the mobile terminal device 100 through communication with this mobile terminal device 100 subsequent to establishment of connection of the mobile terminal device 100 to a power supply terminal 11. Here, the power supply terminal 11 comprises a pair of positive and negative terminals included in the power source apparatus 1 for use in its power supply to the mobile terminal device 100. The power supply apparatus 1 and the mobile terminal device 100 are connected to each other also via a communication terminal 12. The instruction information acquisition section 10 continuously effects the communication with the mobile terminal device 100 by a predetermined cycle via this communication terminal 12 after establishment of connection between the mobile terminal device 100 and the power supply terminal 11. Incidentally, in FIG. 1, for the sake of readiness of understanding, the communication terminal 12 and the power supply terminal 11 are shown to be spaced from each other. Preferably, however, the communication terminal 12 and the power supply terminal 11 can be integrated into a USB connector based on the known USB (Universal Serial Bus) standard.

Figure 2:
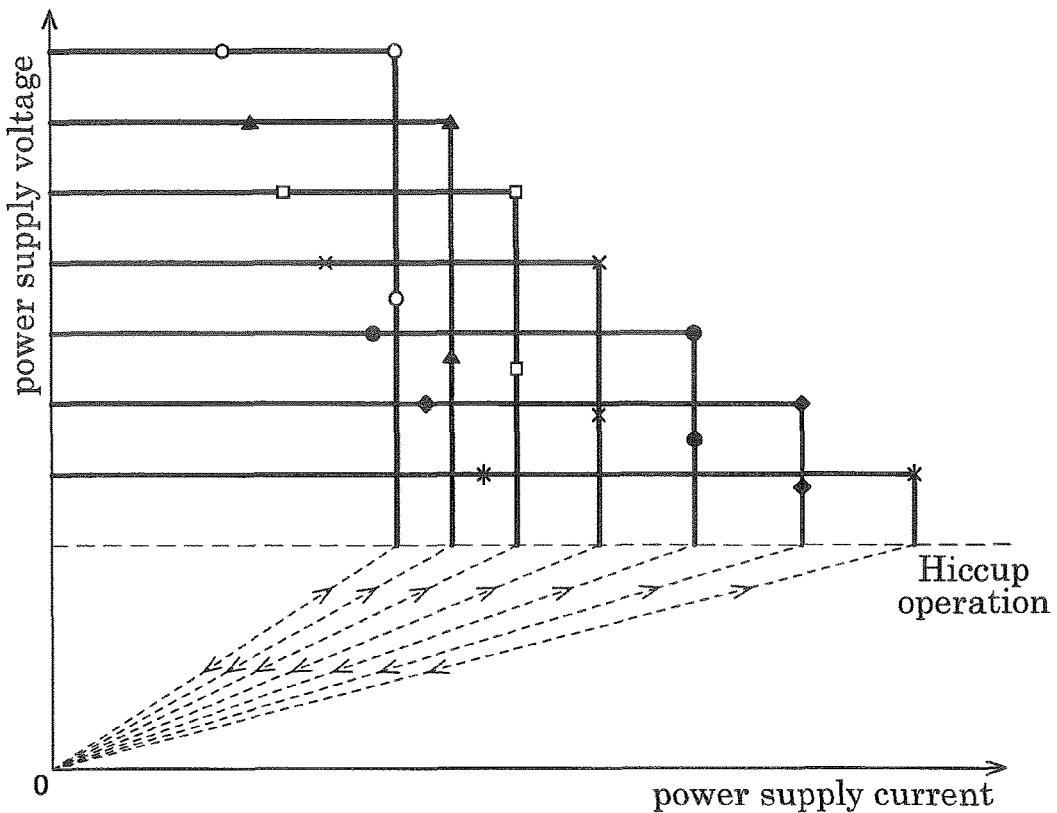
FIG. 2 is a view showing one example of output characteristic of the power source apparatus.

Here, the battery 101 included in the mobile terminal device 100 is charged firstly with a constant current providing a constant charging current and then charged at a constant voltage providing a constant charging voltage. Therefore, in order to allow the mobile terminal device 100 to effect such constant current charging and constant voltage charging of its battery 101 as described above, the power source apparatus 1 is configured with an output characteristic as shown in FIG. 2. An instruction value of the power supply voltage indicated by instruction information is set by the mobile terminal device 100 in accordance with charging efficiency of the battery 101 by this mobile terminal device 100. An instruction for varying the voltage value of such power supply voltage is transmitted from the mobile terminal device 100 in the form of instruction information indicating the instruction value of the power supply voltage and this instruction information is be acquired by the instruction information acquisition section 10.

Referring back to FIG. 1, the power source section 20 includes an AC/DC converter 21, a DC/DC converter 22, a power supply voltage detection section 23 and a control section 25. The AC/DC converter 21 converts an AC voltage inputted to the power source apparatus 1 into a DC voltage. The AC voltage to be inputted to the power source apparatus 1 can be supplied from an electric power company for instance. The AC/DC converter 21 and the DC/DC converter 22 can be configured as a transformer system using e.g. a commercial transformer or a switching system using a switching element.

The DC voltage outputted from the AC/DC converter 21 is made by full-wave rectification of AC voltage. Here, the output from the AC/DC converter 21 is smoothed by an unillustrated smoothing capacitor and then further converted by the DC/DC converter 22 into a DC voltage comprised of a predetermined voltage value. Here, the language "a DC voltage comprised of a predetermined voltage value" corresponds to a DC voltage comprised of a certain preset value (e.g. 5V in the case of USB charging) in the case of unavailability of any instruction information or corresponds to an instruction value of the power supply voltage defined by the instruction information in the case of availability of such instruction information. The DC/DC converter 22 can be formed by using e.g. a step-down DC/DC converter by the known switching system. In particular, for the purpose of improvement in conversion efficiency, a step-down DC/DC converter of the synchronous rectification type can be used also. The operation of the DC/DC converter 22 is controlled by the control section 25 to be described later.

The control section 25 controls the operation of the DC/DC converter 22 based on the instruction information transmitted from the instruction information acquisition section 10. Specifically, through ON-duty control of the switching element included in the DC/DC converter 22, the output voltage of the DC/DC converter 22 will be controlled to be a voltage value based on the indication information. With this, it becomes possible for the power source section 20 to output a power supply voltage having a voltage value based on the instruction information. The output voltage outputted from the DC/DC converter 22 is detected by the power supply voltage detection section 23. This power supply voltage detection section 23 can be configured to determine directly the output voltage of the DC/DC converter 22 or can alternatively be configured to effect the detection through comparison between a voltage obtained by dividing the output voltage of the DC/DC converter 22 by a resistor having a predetermined resistance value with a predetermined reference voltage value.

Further, the power source section 20 is configured also to reduce the voltage value of the power supply voltage in case the power supply current supplied to the mobile terminal device 100 reaches a preset current value in association with the output of the power supply voltage and then to output a current of the preset current value as the power supply current. The power that can be supplied by the power source apparatus 1 is determined in advance for each individual power source apparatus 1. As described above, the power source section 20 outputs a DC voltage comprised of a preset value (e.g. initially 5 V in the case of the USB charging) in the case of unavailability of instruction information and then outputs a DC current comprised of an instruction value of the power supply voltage defined by the instruction information in the case of availability of such instruction information. As the mobile terminal device 100 draws in the output of the power source section 20 at such DC voltage, the mobile terminal device 100 detects a current value of a current that can be outputted by the power source apparatus 1 with reference to the CC (constant current) characteristic and continuously outputs the instruction information indicating an instruction value of the power supply voltage to the power source apparatus 1 for optimizing the charging efficiency of the battery 101 by the mobile terminal device 100. The power source section 20 outputs the power supply voltage at the present voltage value until the instruction information acquisition section 10 acquires new instruction information through communication with the mobile terminal device 100.

Based upon the instruction information acquired by the instruction information acquisition section 10, the control section 25 controls the power source section 20 in such a manner that the mobile terminal device 100 may output the voltage value of a power supply voltage indicated by the mobile terminal device 100. With this, the voltage value of the power supply voltage for the power supply from the power source apparatus 1 to the mobile terminal device 100 can be varied, thus realizing improvement of efficiency at the time of power supply. Incidentally, the power that can be outputted by the power source apparatus 1 (so-called output capacity) is detected by the mobile terminal device 100 at the time of power supply according to the CC characteristic which is effected within a predetermined period (e.g. a few tens of milliseconds) subsequent to establishment of connection between the power source apparatus 1 and the mobile terminal device 100. With this, the power can be detected in the form of output capacity (CC characteristic) by the mobile terminal device 100 for each output voltage.

After connection of the mobile terminal device 100 to the power supply terminal 11, the first protection section 30 stops operation of the power source section 20 if the power supply voltage outputted from this power source section 20 stays below a preset first voltage value for a period defined until lapse of the preset first period from entry into a constant current drooping characteristic past a constant voltage output. Here, advantageously, the "first period" can be set as a period which is longer than a period that allows the mobile terminal device 100 to detect the output capacity of the power source apparatus 1 and that also allows avoidance of smoke generation or ignition even if the mobile terminal device 100 and the power source apparatus 1 are connected under the half short-circuit state.

The first protection section 30 stops the operation of the power source section 20 if the state of the voltage value of the output voltage of the power source section 20 falling below the preset first voltage value continues for the above-described first period. Here, advantageously, the "preset first voltage value" can be set as such a value that deviates from a permissible range of DC voltage comprising a preset value (e.g. 5V in the case of USB charging) in the case of absence of instruction information and that deviates from a permissible range of DC voltage comprising an indication value of power supply voltage defined by instruction information in the case of presence of such instruction information. Further, the above language "stops the operation of the power source section 20" is understood to mean that the power source section 20 enters a so-called Hiccup mode or latch-stopped state. Therefor, according to the control by the first protection section 30, if the voltage outputted from the power source section 20 stays below such preset first voltage value for the first period, the power source section 20 will be rendered into the Hiccup mode or latch-stopped state.

Here, the first protection section 30 advantageously includes a timer 31 for counting the above-described first period. In this case, an arrangement can be provided such that the operation of the power source section 20 is stopped if the power supply voltage outputted from the power source section 20 is below the first voltage value AND a count result of the timer 31 becomes a certain preset value. The arrangement ensures both the ability of the mobile terminal device 100 to detect the output capacity of the power source apparatus 1 and the ability of providing the protection for avoiding occurrence of smoke generation or ignition even when the mobile terminal device 100 and the power source apparatus 1 are connected under the half short-circuit state.

The count stop section 50 stops the counting operation of the timer 31 in case the value of power supply voltage exceeds a first voltage value. Here, the above language "in case the value of power supply voltage exceeds a first voltage value" is understood to mean a case when the output voltage of the power source section 20 has a voltage value within a permissible range of power supply voltage indicated by the indication information. Therefore, the count stop section 50 stops the counting operation of the timer 31 in case when the output voltage of the power source section 20 has a voltage value within a permissible range of power supply voltage indicated by the indication information. Incidentally, after the counting operation of the timer 31 is stopped by the count stop section 50, advantageously, the counting result of the timer 31 will be reset once, and the counting operation will be resumed when the voltage value of the output voltage of the power source section 20 again becomes a value that deviates from the permissible range of the power supply voltage indicated by the indication information. Under this condition too, if the counting result becomes the preset value, the first protection section 30 will again stop the operation of the power source section 20. Incidentally, the situation when the counting operation by the timer 31 is proceeding corresponds to a state when the power supply voltage of the power source apparatus 1 has not yet become the planned voltage value after detection of the output capacity of the power source apparatus 1 by the mobile terminal device 100 or a state when the output of the power source section 20 is operating in accordance with the fold-back type drooping characteristic.

The second protection section 40 is configured to cause the power source section 20 to output the power supply voltage having the voltage value based on the instruction information by a preset second time interval if the voltage value of the power supply voltage outputted from the power source section 20 falls below a preset second voltage value after reaching the planned voltage value. Here, the language "after the power supply voltage outputted from the power source section 20 reaches the planned voltage value" refers to a state when the power source apparatus 1 is outputting a power supply voltage having the predetermined voltage value after detection of the output capacity of the power source apparatus 1 by the mobile terminal device 100.

Figure 3:
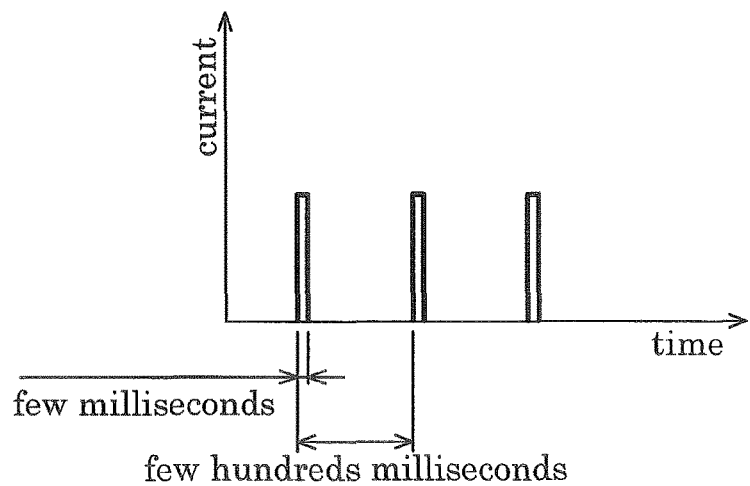
FIG. 3 is a view illustrating a protection operation by a second protection section.

Further, the above language "present second voltage value" is understood to correspond to a threshold value at which the second protection section 40 starts its protection operation for the power source section 20. And, the above language "preset second time interval" is understood to mean a time interval with which the power source apparatus 1 does not provide such amount of energy as may lead to smoke generation or ignition at the power supply terminal 11 even if an unexpected current is outputted from the power source apparatus 1. More particularly, this time interval can be alternating repetition of an outputting state for a few milliseconds and a resting state for a few hundreds of milliseconds. The above language "the power supply voltage having the voltage value based on the instruction information" is understood to represent a power supply voltage indicated by the most recently preceding instruction information. The second protection section 40 causes the power source section 20 to intermittently output a power supply voltage indicated by the most recently preceding instruction information by the above-described time interval. FIG. 3 shows a current waveform of the current outputted from the power source section 20 under the Hiccup operation mode. As shown in this FIG. 3, under the Hiccup operation mode, a current having a predetermined magnitude is outputted for a period of a few milliseconds by a time interval of a few hundreds of milliseconds. Incidentally, under the Hiccup operation mode, the power supply voltage indicated by the most recently preceding instruction information from the power source section 20 is outputted in the above-described manner. In this regard, a voltage value of the observed voltage will be determined by a value of voltage impressed externally to the power supply terminal 11.

The above-described instruction information acquisition section 10 is configured to be capable of acquiring the instruction information even when the counting operation of the timer 31 is suspended by the count stop section 50 or at the time of output according to the fold-back type drooping characteristic. Advantageously, the power source section 20 can be configured to change the voltage value of the power supply voltage based on instruction information, if such instruction information is acquired, under the state of counting of the timer 31 being suspended or the state of outputting according to the fold-back type drooping characteristic and then to output such changed voltage value. With this arrangement, it becomes possible for the mobile terminal device 100 to determine the output capacity of the power source apparatus 1 according to the CC characteristic for a predetermined period after change of the voltage value and to issue a next switching instruction.

With the above-described configuration of the power source apparatus 1, the power source apparatus 1 can be provided with the two kinds of characteristic under the transitional stage at the time of activation of the power source apparatus 1 and the steady state subsequent to the activation. Specifically, under the transitional state, occurrence of abnormal heat generation, smoke generation, ignition, etc. in a period of some few hundreds of milliseconds can be prevented by the first protection section 30. Whereas, under the steady state, occurrence of abnormal heat generation, ignition, etc. at the time of short circuit can be prevented by the second protection section 40. Moreover, with the above-described configuration, it is possible for the mobile terminal device 100 and the power source apparatus 1 to effect communication with each other at the constant current characteristic portion of the fold-back type drooping characteristic of the power source apparatus 1.

Figure 4:
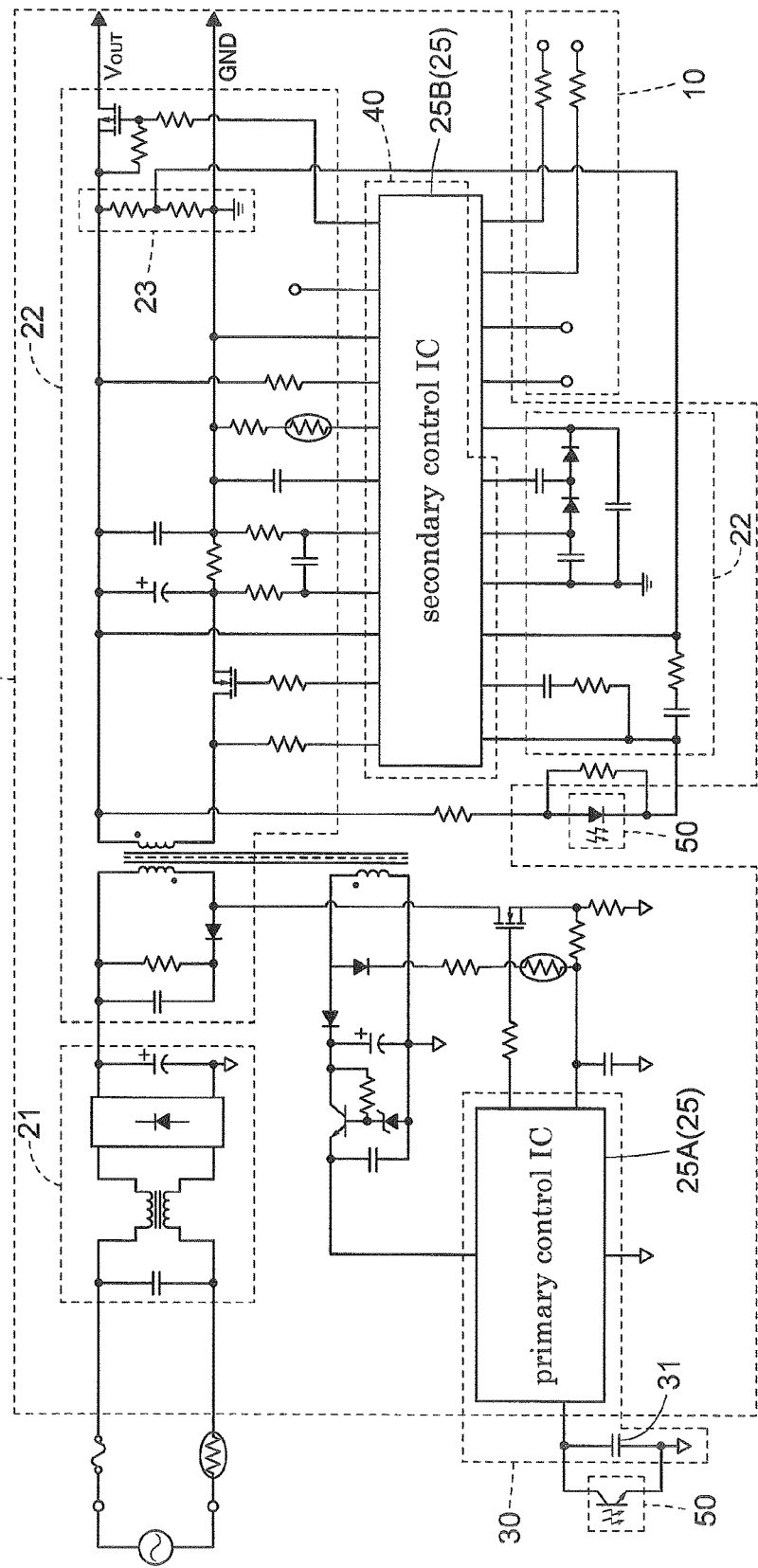
FIG. 4 is a circuit diagram showing one example of configuration of the power source apparatus.

FIG. 4 shows a circuit diagram that specifically shows the above-described configuration of the power source apparatus 1. In the example shown in FIG. 4, the AC/DC converter 21 employs a rectifying circuit using diode bridge. Also, the power supply voltage detection section 23 is constituted of two resistors so that the output of the DC/DC converter 22 is voltage-divided by these two resistors for detection of the power supply voltage. Here, in case the power supply current outputted from the power source section 20 is detected on the primary side, a source current of a switching element used for dropping the output voltage of the AC/DC converter 21 to a predetermined voltage can be detected and the power supply current can be calculated based on the result of this detection. With this arrangement, it becomes possible to detect the output capacity of the power source apparatus 1 on the primary side. Needless to say, an arrangement can be provided so that the detection is effected on the secondary side also, if desired.

The control section 25 employs a control IC. In the case of the example shown in FIG. 4, the control section 25 uses a primary control IC 25A and a secondary control IC 25B separately. The first protection section 30 is constituted by using the control section 25 and a capacitor (one example of the timer 31). In this case, the counting time of the timer 31 will be set by charging the capacitor. Needless to say, however, the control section 25 can incorporate the timer 31. Further alternatively, the timer 31 can be constituted by using a different circuit arrangement. The second protection section 40 is incorporated within the secondary control IC 25B. The DC/DC converter 22 shown comprises the synchronous rectification type. Incidentally, by controlling an operation of one (the switching element provided on the output stage: P type MOSFET) of the switching elements used in switching of synchronous rectification, the output sequence of the power source section 20 can be controlled. Incidentally, alternatively the second protection section 40 can be incorporated within the primary control IC 25A and the switching element provided in the output stage can employ an N type MOSFET if desired.

The count stop section 50 is constituted by using a phototransistor and a photodiode and configured such that the phototransistor is activated upon flowing of a current in the photodiode, thereby to short-circuit between terminals of the capacitor included in the first protection section 30 and used as the timer 31. With this, switchover to the fold-back type drooping characteristic is made possible. The instruction information acquisition section 10 includes a terminal to be able to communicate with the mobile terminal device 100. Although the power source apparatus 1 can be configured with the above-described circuit arrangement, the control section 25 can be constituted of a single control IC, rather than being divided into the primary control IC 25A and the secondary control IC 25B. Incidentally, the above-described arrangement of the count stop section 50 that short-circuits the terminals of the capacitor employed as the timer 31 is just exemplary, but a different circuit arrangement can be employed as well, if desired.

OTHER EMBODIMENTS

In the foregoing embodiment, it was explained that the instruction information acquisition section 10 effects the communication with the mobile terminal device 100 continuously by a predetermined cycle after establishment of connection between the mobile terminal device 100 and the power supply terminal 11. However, the instruction information acquisition section 10 can be configured to effect the communication only when instruction information is transmitted thereto from the mobile terminal device 100.

In the foregoing embodiment, it was explained that the instruction value of the power supply voltage indicated by the instruction information is set in accordance with the charging efficiency of the battery 101 by the mobile terminal device 100. However, the instruction value of the power supply voltage indicated by the instruction information can be set according to the service life of the battery 101 as well.

In the foregoing embodiment, it was explained that the power source section 20 changes the voltage value of the power supply voltage based on the instruction information and outputs the changed voltage value in case the instruction information is acquired under the state of the counting operation of the timer 31 being suspended. However, the power source section 20 can alternatively be configured not to change the voltage value of the power supply voltage in case the counting operation of the timer 31 is suspended.

This disclosure is applicable to a power source apparatus for effecting power supply to a mobile terminal device.

The invention claimed is:

1. A power source apparatus for supplying power to a mobile terminal device having a battery and configured to charge the battery with the power, the apparatus comprising:
    an instruction information acquisition section configured to acquire instruction information indicating an instruction value for a power supply voltage to be supplied to the mobile terminal device by communicating with the mobile terminal device after the mobile terminal device is connected to a power supply terminal;
    a power source section configured to output a power supply voltage having a voltage value based on the instruction information and configured also to reduce a voltage value of the power supply voltage if a power supply current to be supplied to the mobile terminal device reaches a preset current value in association with output of the power supply voltage and then to output a current comprising the preset current value as the power supply current;
    a first protection section configured to stop operation of the power source section if the power supply voltage outputted from the power source section stays below a preset first voltage value during lapse of a present first period after connection of the mobile terminal device to the power supply terminal; and
    a second protection section configured to cause the power source section to output the power supply voltage having the voltage value based on the instruction information by a preset second time interval if the power supply voltage outputted from the power source section falls below a preset second voltage value after reaching a target voltage value.

2. The power source apparatus of claim 1, wherein:
    the instruction information acquisition section is configured to effect continuously its communication with the mobile terminal device by a predetermined interval after establishment of connection between the mobile terminal device and the power supply terminal; and
    the power source section is configured to output the power supply voltage of a current voltage value until new instruction information is acquired by the communication.

3. The power source apparatus of claim 1, wherein the instruction value of the power supply voltage indicated by the instruction information is set according to a charging efficiency of the battery by the mobile terminal device.

4. The power source apparatus of claim 2, wherein the instruction value of the power supply voltage indicated by the instruction information is set according to a charging efficiency of the battery by the mobile terminal device.

* * * * *